March 11, 1947.　　　K. F. RUSSELL　　　2,417,130
AIR CLEANING APPARATUS
Filed April 10, 1944
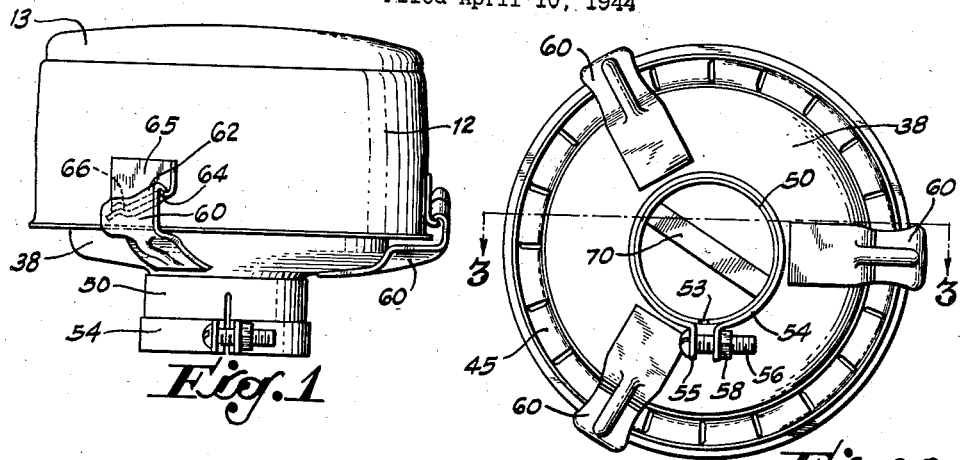
Fig. 1
Fig. 2
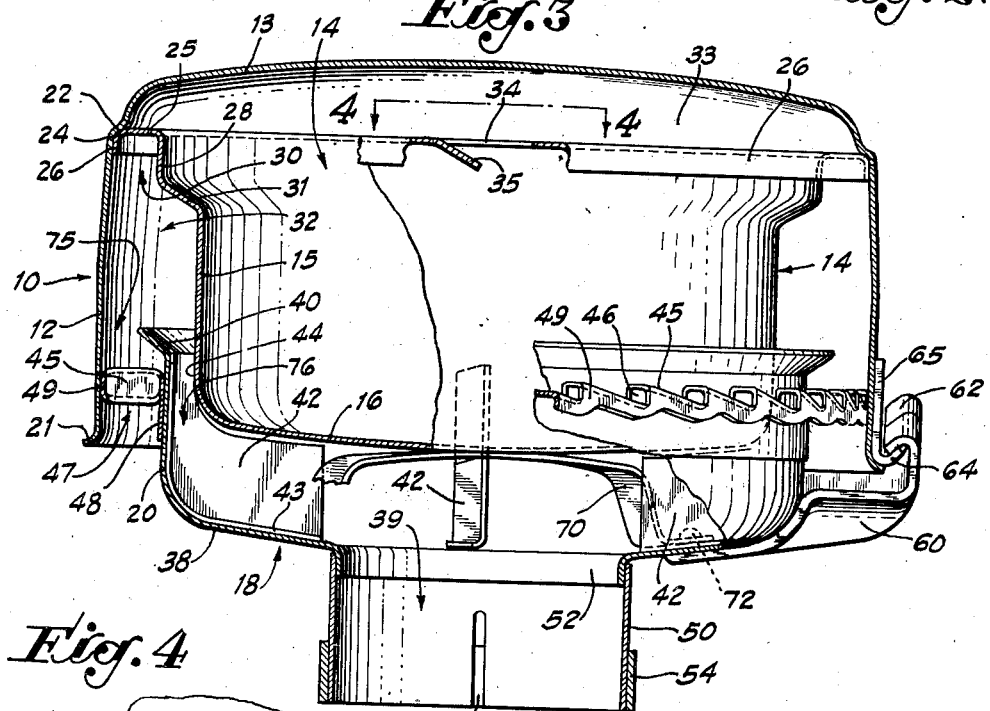
Fig. 3
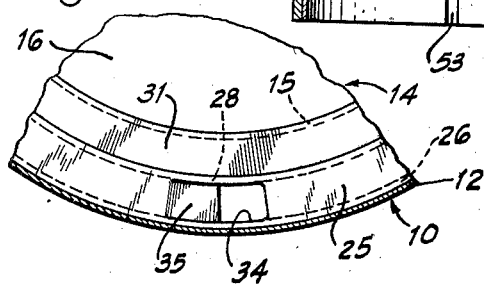
Fig. 4
INVENTOR
KENNETH F. RUSSELL
BY
HARRIS, KIECH, FOSTER & HARRIS
FOR THE FIRM
ATTORNEYS Patented Mar. 11, 1947

2,417,130

UNITED STATES PATENT OFFICE 2,417,130

AIR CLEANING APPARATUS

Kenneth F. Russell, Claremont, Calif., assignor, by direct and mesne assignments, to Herman H. Garner, Claremont, Calif.

Application April 10, 1944, Serial No. 530,291

12 Claims. (Cl. 183—91)

This invention relates to the cleaning of air by dry centrifugation, and it is especially adapted to conditioning air being supplied to carburetors for internal combustion engines of tractors, trucks, tanks, and the like. Where dust conditions are particularly bad, as where tractors and tanks are operated in fields and open country, it may be advantageously used as a pre-cleaner ahead of air filters, such as oil-bath filters. The invention particularly relates to cleaners of the collector type, as distinguished from ejector type cleaners. Air cleaners of the ejector type discharge separated dust to the atmosphere and are objectionable because of reduced efficiency resulting from the entry of air into the cleaner through a port from which dust particles are being ejected. Air cleaners of the collector type retain the dust in an appropriate receptacle, but heretofore these have offered the objection that they have been susceptible to leaks from the outside atmosphere at joints where the collecting receptacles have been mounted upon the air cleaner, these leaks interfering with air flow and dust elimination.

One object of the present invention is to provide an air cleaner of the collector type which employs no joints between the cleaner and the dust collector by way of which communication with the outside atmosphere can develop, thereby avoiding all possibility of leaks. Another object is to provide a compact apparatus wherein the dust collector is so arranged as to be protected from overhanging tree branches and other obstacles when the air cleaner is used in an exposed position, as is often the case on tractors. These objects are accomplished by enclosing the dust collector within the cleaner housing.

Another object is to provide apparatus for obtaining high rates of centrifugation of air and also for combining different types of centrifugation whereby to improve the efficiency.

Another object is to improve air flow in connection with centrifugation of air being cleaned and to provide novel means therefor.

Inventive concepts are found in several different features individually, and in various combinations of these features, presented by the apparatus and method herein disclosed. I have discovered that improved dust separation may be obtained by producing centrifugation in different ways, each having a dust separating influence. These include: producing rotation of the air stream about an axis; deflecting the air stream to cause dust particles to impinge against an outer wall; lowering the radial velocity so that rotating air undergoing centrifugation may move greater distances about an axis; and reversing the direction of the air stream so that dust particles pass therefrom by resultant centrifugal force. I have discovered also that dust separation can be improved by providing a sort of air cushion in a relatively sheltered zone placed across the path of travel of dust particles leaving the air stream when the air stream is reversed. I have made the further discovery that improved dust separation is obtained by reducing the thickness of the air stream to an optimum at a point where the air stream is made to impinge upon a wall. I have discovered further that if the air stream is continued in a comparatively narrow path and is withdrawn from the cleaning region at a low velocity, a high rate of centrifugation is maintained and dust elimination is greatly enhanced. Also, efficiency of air flow to a carburetor intake or other point of use is improved when rotation originally imparted to the moving air body is stopped after the air cleaning step has been completed. By eliminating all leaks from the outside atmosphere, air flow efficiency and dust elimination are further improved. Each of these features is individually important, and when all are employed together, optimum results are accomplished.

The various features of novelty in the apparatus are to be found in the various relationships hereinafter disclosed between an imperforate casing or hood in a closed end of which is seated a dust cup having walls spaced a limited distance in approximate parallelism with walls of the casing or hood, and an air guiding bowl having walls projecting between outer portions of the parallel walls of the dust cup and the casing. Other novel means for accomplishing the results described include means to deflect the incoming air stream against the outside casing wall and thereby narrow it, means to form a relatively narrow, sheltered relatively quiet air zone which creates an air cushion, means to turn the air stream and reverse its direction, and means providing a region of low air velocity where the direction of the air stream is being reversed, each of these means representing an individual novel concept, as do various combinations thereof. These means, when employed in combination, serve to produce a high centrifugal action about the vertical axis of the device, a relatively high velocity vertically and toward the outer wall of the casing to impart a high initial velocity to the dust particles in the direction of the outer wall, and then to lower the air velocity immediately thereafter so that the dust particles travelling about the outer wall can be carried into a relatively quiet zone where they may be ejected into the dust cup.

In the accompanying drawings, wherein one embodiment of the invention is shown by way of illustration only, Figure 1 is an elevation;

Figure 2 is a bottom plan view;

Figure 3 is chiefly a vertical cross section taken approximately from the line 3—3 of Figure 2, parts being shown in elevation; and Figure 4 is a fragmentary plan taken from the line 4—4 of Figure 3.

The form of air cleaner shown in the drawings includes a casing in the form of a hood 10 having imperforate cylindrical side walls 12 integral with an imperforate top wall or dome 13; a dust cup 14 having imperforate cylindrical side walls 15 parallelling the walls 12 of the hood 10 and integrally connected with an imperforate bottom wall 16; and an air guiding bowl 18 having imperforate cylindrical side walls 20 disposed in part between the outer portions of the cylindrical walls 12 and 15 of the hood 10 and dust cup 14, respectively, the bowl 18 having means adapted for mounting the device upon the intake of a carburetor.

While the air cleaner of the drawings is indicated as having its axis in a vertical position, the device nevertheless may be employed with its axis in a horizontal position or in an inclined position. Referring to the position shown in the drawings, the lower end of the hood 10 is open, and its lower edge is conveniently flared outwardly in the form of an air directing lip 21 extending annularly around the hood 10. Between the side walls 12 and the top 13 of the hood 10, there is disposed an annular shoulder 22 which rests upon an annular seat 24 of the dust cup 14. The seat 24 is formed by rolling over the edge of an annular transverse flange 25 of the dust cup 14 to form a depending circular skirt 26 which loosely engages the adjacent portions of the cylindrical side walls 12 of the hood 10 to form a joint which need not be air-tight, but, by reason of the nature of the parts 22 and 24, does not provide any distinct air passage. Depending sharply, that is, at an angle of about ninety degrees, from the inner edge of the annular flange 25, is a short cylindrical confining wall 28 which, by reason of the narrowness of the flange 25, provides a narrow annular sheltered zone 30 between said short cylindrical wall 28 and the opposing portions of the cylindrical walls 12 and the skirt 26. This narrow annular sheltered zone 30 performs an important air cushioning and dust collecting function to be described hereinafter. Integrally connected with the lower edge of the circular wall 28 is an inclined reentrant air deflecting wall or shoulder 31 which is integral with the main body of the dust cup formed by the cylindrical side walls 15. Thus, an air receiving and air reversing chamber 32 is formed of annular shape which is bounded on the outside by the cylindrical walls 12 of the hood 10 and on the inside by the cylindrical walls 15 of the dust cup 14, its upper limit being defined by the sheltered zone 30 and the inclined deflecting shoulder 31.

Between the various walls of the dust cup 14 and the top wall 13 of the hood 10 there is formed a dust receiving chamber 33 to which separated dust gains access through a small dust escape port or passage 34 formed in the transverse flange 25 and into which dust is deflected by means of a struck up vane 35 carried by the flange 25 at one end of the port 34.

The cylindrical air guiding walls 20 of the bowl 18 extend downwardly and merge into a lower inclined air deflecting wall 38 leading to a central air outlet passage 39 concentric with the axis of the cleaner. The upper portions of the cylindrical walls 20 carry an upwardly inclined, outwardly directed, imperforate air-deflecting flange 40 by means of which dust particles are caused to impinge on the outside walls 12. Disposed between the dust cup 14 and the air guiding bowl 18 is a plurality of baffles 42 which may be secured to the bottom wall 38 and to the cylindrical walls 20 through the medium of flanges 43. As shown, the upper portions of the baffles 42, which are narrow with respect to the lower portions, engage the adjacent walls 15 as indicated at 44 for the purpose of positioning the walls 20 with respect to the dust cup 14. The baffles 42 have the further function of checking a rotary air movement that has previously been imparted by a circular series of louvers 45 disposed at a suitable angle, for example, thirty degrees to the horizontal, and providing a series of air passages 46 for directing the air into the chamber 32 from an annular entrance space 47. The louvers 45 are carried on a cylindrical flange 48 which is secured to the cylindrical walls 20 of the bowl 18. The peripheral edges of the louvers 45 are joined by a narrow peripheral flange 49 which frictionally engages the cylindrical walls 12 of the hood 10. Thus, the louvers 45 span the annular space 47 between the cylindrical walls 12 and 20.

The air cleaner of the present invention is adapted to be mounted upon the intake of a carburetor, such as the air intake stack that projects from the hood of a tractor, in any suitable manner, as by means of a neck 50 secured to a circular offset 52 integral with the bottom wall 38 of the bowl 18. In the form shown, the neck 50 is split at 53 and is adapted to be clamped on the carburetor intake by means of a collar 54 having offset ears 55 through which is passed a locking bolt 56 secured by means of a nut 58. For purposes of retaining the hood 10, the dust cup 14, and the air guiding bowl 18 in properly assembled operative relationship, arms 60, secured as by welding to the bottom wall 38 of the bowl 18, are provided whose outer ends extend upwardly and carry downwardly directed gripping means 62 which cooperate with corresponding upwardly directed grips 64 carried by lugs 65 secured to the outer faces of the cylindrical walls 12. As shown, each of the gripping means 62 and 64 is inclined with relation to the width of the air cleaner and is provided at an intermediate point with a detent 66. The gripping means 62 and 64 are engaged and disengaged by slight rotation of the air guiding bowl 18 with respect to the hood 10 whereby each pair of detents 66 is moved to or from engaging position. In order to insure firm engagement between the parts at their various points of contact, a relatively strong leaf spring 70 or the like is positioned for engagement with both the bottom wall 16 of the dust cup 14 and the bottom wall 38 of the bowl 18. In the form shown, the spring 70 is arched so that its middle portion engages the bottom 16 of the dust cup 14 and its ends engage the wall 38 of the bowl 18, being secured thereto as by means of rivets 72. Thus, when the grips 62 and 64 are rotated into operative engagement, the spring 70 is tensioned, thereby forcing the dust cup 14 into firm engagement at the shoulder 22 and at the same time insuring firm engaging contact between the gripping means 62 and 64. Thus, the detents 66 are retained in operative engagement, and all rattling of the parts is prevented.

Operation

When employing an apparatus of the present invention, it may be mounted directly upon the air intake of a carburetor of a tractor or truck or the like, or it may be mounted ahead of an air filter, such as an oil-bath filter, so that the present air cleaner acts as a precleaner. When in operative position, partial vacuum produced through the air intake of the carburetor by operation of the engine is made effective through the neck 50 and the central air passage 39 in the bowl 18, and the effect is transmitted to the chamber 32 and thence to the annular space 47 between the cylindrical walls 20 of the bowl 18 and the air directing lip 21 at the open end of the hood 10. Thus, this space 47 becomes an air intake passage. The annular air stream so induced by the engine suction moves through the air passages 46 formed by the louvers 45, whereby its direction is changed and a rotating movement is imparted by reason of the inclination of the louvers 45. After leaving the passages 46, the rotating air stream moves toward the deflecting flange or inclined wall 40 whereby it is directed outwardly against the cylindrical walls 12 of the hood 10, thus causing dust particles to impinge upon the walls 12 and thus tending to aid the separative effect of the centrifugal force imparted by the rotating air body. In deflecting the air stream by means of the flange 40, a thin air stream is produced in a zone indicated at 75, with the result that the moving dust particles in the air have a shorter distance to travel before reaching the adjacent walls 12. This has been found to have a very salutary effect in removing dust particles, and I have discovered that there is an apparent optimum thickness of the air stream for each diameter of air cleaner substantially as represented by the proportions shown in the drawings. As the air stream continues upward in the relation shown in Fig. 3 and also progresses by rotation within the hood 10, the separated dust particles move along the inner faces of the walls 12 toward the sheltered zone 30 between the confining walls 28 of the dust cup 14 and the opposing portions of the walls 12 and the skirt 26. Some of the air stream turns toward the walls 15 of the dust cup 14 soon after passing above the deflecting flange 40, but dust particles therein continue to rise due to their inertia. It is important that the vertical distance from the edge of the lip 40 to the entrance of the sheltered zone 30 be sufficiently great that the radial velocity of the air at this point of entrance be low enough for the centrifugating air to travel a relatively great distance about the vertical axis, whereby to provide more time for dust particles to travel toward the outer walls 12, and to reduce turbulence at the entrance to the zone 30 and a tendency to draw dust particles away from the outer walls 12.

The air stream traveling into the upper portion of the chamber 32 adjacent the sheltered zone 30 is turned toward the dust cup wall 15 and directed downwardly by reason of the influence of an air cushion in the sheltered zone 30 and the downward inclination of the inclined deflecting wall 31. Thus, the air stream is reversed, with respect to its vertical projection; that is, its vertical path is turned through an arc of 180°. Since the dust particles continue to travel by reason of inertia when the air stream is reversed, another influence due to centrifugal force is imparted by reason of the change in direction of the upward flow. This action is facilitated by a lowering of air velocity which results from the relatively large size of the chamber 32.

When the rotating air stream is reversed in the air chamber 32, the separated dust particles travel into the air cushion in the sheltered zone 30. Since this zone 30 is relatively narrow by reason of the location of the confining walls 28, as compared with the air reversing chamber 32, the air condition in the zone 30 is one of relative quiescence rather than one of distinct air currents which are changing their direction of travel as in the chamber 32. However, there is a rotary motion which causes the resultant air cushion to travel in a circular path under the flange 25, which causes the dust particles to move with it until they reach the dust escape port 34 and are deflected therethrough into the dust chamber 33 by the vane 35. As the air reversing action is continuous throughout the air chamber 32, the movement of dust particles into the sheltered zone 30 is continuous, and the travel of the air body therein and contained dust particles is continuous, discharge of dust particles through the port 34 being likewise continuous.

Since the joint between the dust cup 14 and the hood 10 at the shoulder 22 is aligned with the air intake passage 75 and is in the path of travel of the incoming air, there is no leakage from the outside atmosphere, and consequently no air leakage to interfere with dust removing operations, or with air flow, even though the joint between the shoulder 22 and the seat 24 be not absolutely tight. Since all walls are imperforate along the path of travel of the air stream, excepting only the dust escape port 34, no incoming air is deflected into the bowl 18 until it has been cleaned.

After exclusion of dust from the air stream and its reversal in the chamber 32, the cleaned air is directed by the inclined flange 40 into outlet passages 76 located between the baffles 42 and arranged around the space between the walls 15 of the dust cup 14 and the outer cylindrical walls 20 of the bowl 18. When the reversed rotating air stream moves into said passages 76, its rotation is checked by the baffles 42 so that, when it leaves the passages 76 and moves into the central air removal passage 39, it has only a straight-line motion free from rotational influence. This permits a more direct flow of the cleaned air to the point of subsequent use.

From the foregoing, it will be apparent that the dust cup 14 not only provides a receptacle to receive collected dust, but also depends well within the walls 12 of the hood 10 to provide means for limiting the width of the air chamber 32 to such dimensions as insure an actively moving air stream at all times, and further to cooperate with the cylindrical walls 20 and the deflecting flange 40 of the air guiding bowl 18 to define relatively narrow down-draft passages 76 and a correspondingly narrow up-draft passage between the edge of the flange 40 and the adjacent wall portions 12. At the same time, the bottom wall 16 of the dust cup 14 cooperates with the baffles 42 to form the passages 76 and stop rotation which has been previously imparted to the air stream by the louvers 45.

The functioning of the present air cleaner is the same whether it be mounted within its axis in a vertical position as illustrated in the drawings, or positioned on a horizontal axis. In the latter instance, it is preferable that the dust escape port 34 be placed in some other than the lowest position so that gravitational effects upon accumulated dust will not hinder passage of dust particles through the port 34 into the dust chamber 33.

From the foregoing disclosure it will be apparent to those skilled in the art that modifications may be made which will embrace the same inventive concepts. Therefore, it is intended to protect by the appended claims all such variations as fall within their scope.

I claim as my invention:

1. An air cleaner, comprising: a hood having cylindrical walls and an enclosing top wall; a dust cup within and connected to said hood having walls substantially parallelling said cylindrical walls of said hood and spaced therefrom forming an annular air chamber; an annular flange on said cup engaging said cylindrical walls of said hood and overhanging a portion of said air chamber; annular air deflecting walls carried by said cup walls and overhanging another portion of said air chamber; short cylindrical walls connected with the peripheral portions of said deflecting walls and joining the inner edge of said flange with said deflecting walls, thereby forming a relatively narrow sheltered annular air zone between said short cylindrical walls and adjacent walls, there being a dust passage from said zone into said dust cup; and means for directing air into said air chamber and means for directing air from said air chamber.

2. An air cleaner, comprising in combination: a casing member having side walls and a top wall, its bottom being open; a cup member within said casing member and constituting a dust receptacle in cooperation with said top wall, said cup member having side walls depending within said side walls of said casing member and defining an air chamber within said casing member, one of said members having confining walls depending in the upper portion of said chamber and forming a relatively narrow sheltered zone, there being a dust escape port leading into said receptacle from said zone; and air guiding means having upstanding walls projecting into the space between the side walls of the casing member and the side walls of the cup member, thereby forming an air intake passage and an air outlet passage on opposite sides of said upstanding walls.

3. An air cleaner according to claim 2, wherein the inlet and outlet passages are relatively narrow and approximately equal in cross section to maintain actively moving air streams.

4. An air cleaner according to claim 2, wherein means are provided in the air intake passage for imparting rotation to the entering air body.

5. An air cleaner according to claim 2, wherein the edge of said guiding means in said chamber has a flange directed toward the adjacent side wall of the casing member to cause incoming dust particles to impinge on said wall and to reduce the thickness of an entering air stream.

6. An air cleaner according to claim 2, wherein means are provided in the air intake passage for imparting rotation to the entering air body, and the edge of said guiding means in said chamber is provided with an air deflecting flange directed toward the adjacent side wall of the casing member and adapted to reduce the thickness of an entering air stream and to cause dust particles to impinge on said adjacent side wall.

7. In an air cleaner according to claim 2, deflecting means on the air guiding means within said hood adapted to direct the air stream against the side walls of said hood and reduce the thickness of the air stream, the space in said air chamber between said deflecting means and said sheltered zone having sufficient length to cause material reduction in air velocity and facilitate dust separation.

8. An air cleaner comprising in combination: a hood having cylindrical side walls and a wall enclosing one end, the other end being open; a dust cup fitted within said hood enclosing a dust chamber between the cup and the end wall of said hood, and having cylindrical side walls spaced from the side walls of said hood and providing an air chamber between them; an air guiding bowl having peripheral walls disposed within the open end of said hood between the side walls of said hood and the side walls of said cup and spaced therefrom to provide an annular air inlet passage and an annular air outlet passage; means in said inlet passage to impart rotation to entering air; means on the edge of said bowl within said hood to deflect entering air against the side walls of said hood and to reduce the thickness of the air stream; an annular flange on said dust cup disposed transversely across said air chamber substantially in alignment with said air inlet passage and overhanging a portion of said air chamber; a short cylindrical wall extending from the inner portion of said flange toward an intermediate position in said chamber and defining a narrow sheltered zone within the walls of the hood; and a reentrant air deflecting wall connected with said short wall and joining it with said side walls of said dust cup.

9. An air cleaner comprising in combination: a hood member having side walls and a wall enclosing one end, the other end being open; a dust cup member within said hood member enclosing a dust chamber between the cup member and the end wall of the hood member, and having side walls spaced from the side walls of said hood member, the side walls of one of said members being offset intermediate its length with respect to the side walls of the other member to provide a relatively narrow sheltered zone between said walls opposite from said open end and a relatively wider air receiving and reversing zone, there being a dust port leading from said narrow zone to said dust chamber; and air guiding wall means positioned between said spaced walls of said hood member and said cup member and terminating short of said zones, said wall means forming an air intake passage on one side thereof and an air outlet passage on the other side thereof.

10. A combination according to claim 9, including means for imparting rotation to entering air.

11. An air cleaner comprising in combination: a hood having cylindrical side walls and a wall enclosing one end, the other end being open; a dust cup fitted within said hood enclosing a dust chamber between the cup and the end wall of said hood, and having cylindrical side walls spaced from the side walls of said hood and providing an air chamber between them; an air guiding bowl having peripheral walls disposed within the open end of said hood between the side walls of said hood and the side walls of said cup and spaced therefrom to provide an annular air inlet passage and an annular air outlet passage; an annular flange on said dust cup disposed transversely across said air chamber substantially in alignment with said air inlet passage and overhanging a portion of said air chamber; a short cylindrical wall extending from the inner portion of said flange toward an intermediate position in said chamber and defining a narrow sheltered zone within the walls of the hood; and a reentrant air deflecting wall connected with said short wall and joining it with said side walls of said dust cup.

12. A combination as in claim 11 including means in said inlet passage to impart rotation to entering air.

KENNETH F. RUSSELL.

REFERENCES CITED

The following references are of record in the file of this patent:

UNITED STATES PATENTS

| Number | Name | Date |
|---|---|---|
| 1,934,311 | Kegerreis, et al. | Nov. 7, 1933 |
| 1,641,746 | Donaldson | Sept. 6, 1927 |
| 1,762,493 | Watrous | June 10, 1930 |
| 1,831,805 | Donaldson | Nov. 17, 1931 |
| 2,193,479 | Donaldson | Mar. 12, 1940 |

FOREIGN PATENTS

| Number | Country | Date |
|---|---|---|
| 280,829 | British | Nov. 24, 1927 |
| 688,980 | French | Sept. 1, 1930 |